June 16, 1953  M. A. LAMB ET AL  2,641,830
METHOD OF MAKING CORRUGATED TUBES
Filed Nov. 2, 1948  2 Sheets-Sheet 1
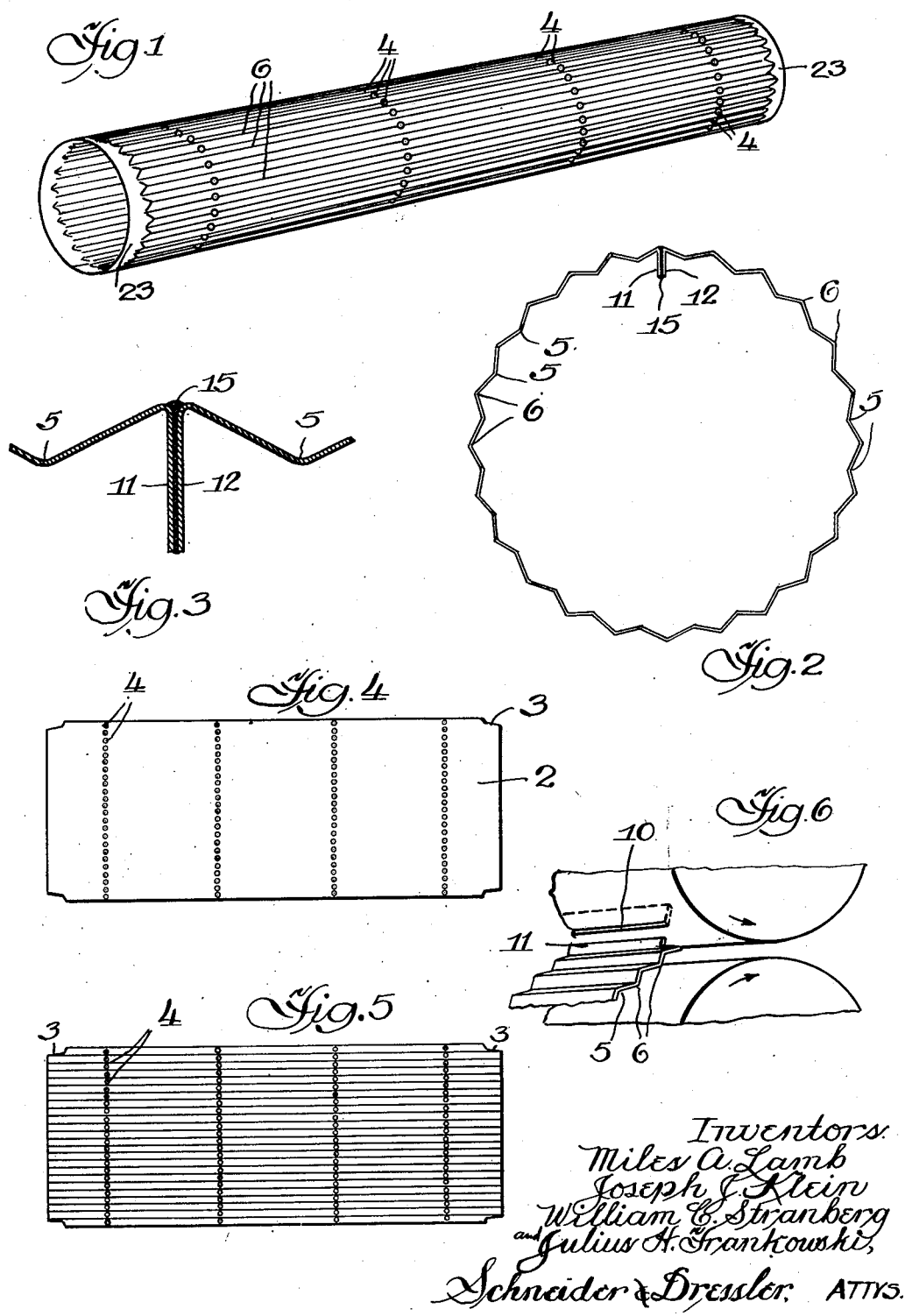

June 16, 1953 M. A. LAMB ET AL 2,641,830
METHOD OF MAKING CORRUGATED TUBES
Filed Nov. 2, 1948 2 Sheets-Sheet 2

Inventors.
Miles A. Lamb,
Joseph J. Klein,
and William E. Stranberg
Julius H. Frankowski.
Schneider & Dressler, Attys.

Patented June 16, 1953

2,641,830

UNITED STATES PATENT OFFICE 2,641,830

METHOD OF MAKING CORRUGATED TUBES

Miles A. Lamb, Chicago, Joseph J. Klein, Glencoe, William C. Stranberg, Elmhurst, and Julius H. Frankowski, Chicago, Ill., assignors to Chicago Pump Company, a corporation of Delaware Application November 2, 1948, Serial No. 58,002

6 Claims. (Cl. 29—156)

This invention relates to a method of making foraminated corrugated tubes particularly adapted to serve as cores for diffuser tubes in a sewage aeration tank or other tank for aeration of liquids, and to the resulting tube core.

Diffuser tubes of the type to which the present invention pertains are fully described in the application of Carl H. Nordell, filed February 26, 1947, under Serial No. 730,931. In general, such diffuser tubes comprise a foraminated corrugated core about which a single layer of cord having a non-circular cross section is tightly wrapped.

The essential requirements for a tube core of this type are sufficient structural strength to hold the winding and a reasonably round surface so that the winding may be applied efficiently. The tube core may be of stainless steel because of the strength and corrosion resistance qualities required. Other metallic materials having the desired qualities may, of course, be used.

In general, the tube cores are formed by bending a metal sheet or blank into the form of a tube and seaming the ends of the formed sheet. Attempts to form the seam by welding were not successful because the heat caused the stainless steel adjacent the seam to lose its temper and the tube could not hold the windings without collapsing. Electric arc spot welding was also unsuccessful because it caused carbide precipitation on the stainless steel and that resulted in corrosion with consequent deterioration of the tube.

The present invention is directed to a method of forming a joint of sufficient strength without heating the steel to a temperature high enough to cause loss of temper. The present method also eliminates any possibility of subsequent deterioration due to corrosion caused by carbide precipitation. Another advantage of the present method of forming the tube is that end caps may be applied to the finished tube without difficulty.

The method of forming the tube with the above mentioned advantages will be described in detail in the following specification, taken in conjunction with the accompanying drawings, in which:

Figure 1 is a perspective view of a tube made in accordance with the present invention;

Fig. 2 is a cross sectional view through the tube showing the joint;

Fig. 3 is an enlarged detail sectional view of the tube joint;

Fig. 4 is a plan view of the blank from which the tube is made;

Fig. 5 is a plan view of the blank after it has been apertured and corrugated. In this form the blank is ready to be shaped into tube formation;

Fig. 6 is a fragmentary diagrammatic view showing the end of the corrugated blank ready to be inserted into the rolling mill by means of which it is curved into tubular shape;

Figure 7:
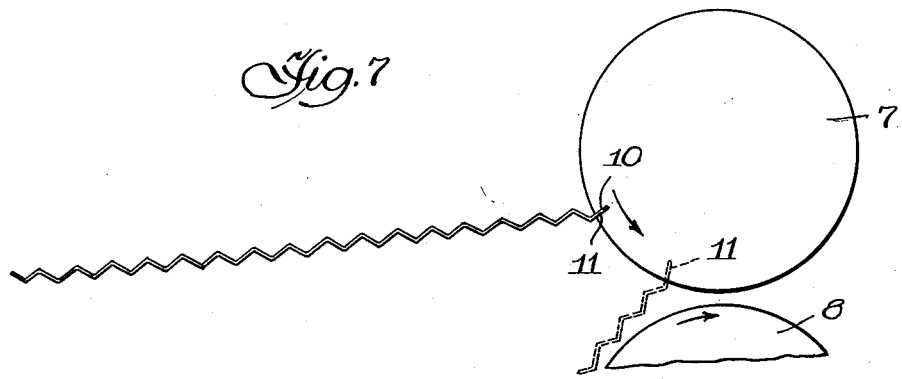
Fig. 7 is a diagrammatic view showing (in full lines) the corrugated blank as it is inserted in the mill and (in dotted lines) the position of the blank just before it is curved.
Figure 8:
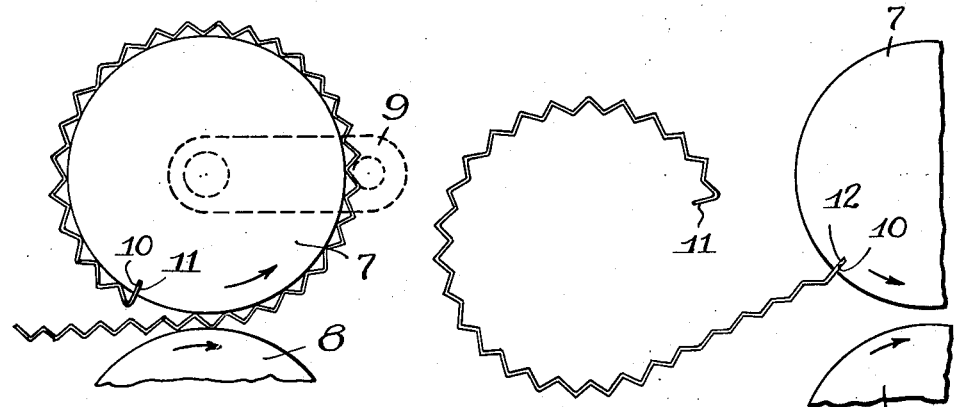
Fig. 8 is a side elevation showing the corrugated blank at the end of the initial curving operation.
Figure 9:
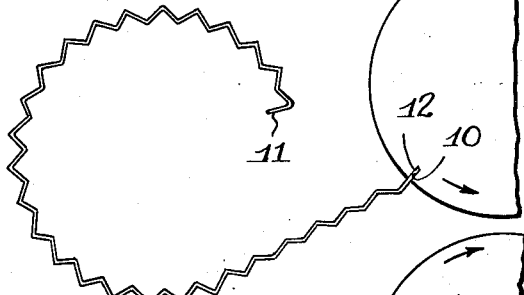
Fig. 9 is a diagrammatic view showing the partially curved blank reinserted into the mill for the final curving operation.
Figure 10:
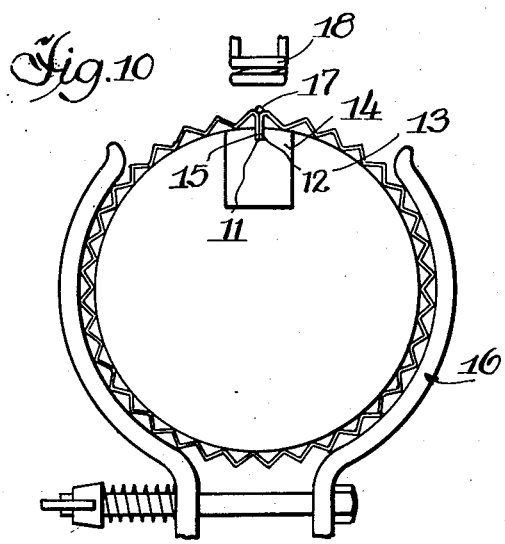
Fig. 10 is an end view of the completely curved blank in a mandrel just before the seaming operation.

In the drawings, the reference numeral 2 indicates a blank preferably of stainless steel or similar non-corrosive metal. The first step in the fabrication of the tube is the notching of the four corners of the blank, as indicated at 3. These notches allow for the spreading of the metal when the corrugations are flattened after the tube has been formed. A plurality of small apertures 4 is then punched or drilled in the blank after which the blank is corrugated longitudinally to provide valleys 5 and ridges 6. The blank is corrugated so that apertures 4, which are aligned transversely, are positioned in each valley 5. In the standard length of tube it is preferred to have four equally spaced apertures in each valley, but this number may be varied.

The rolling mill comprises two rolls 7 and 8, preferably of equal size, spaced apart a distance substantially equal to the radial distance between peaks 6 and valleys 5. A lever 9 is secured to roll 7 by means of which roll 7 may be raised substantially above roll 8. Roll 7 contains a slot 10 into which the end of blank 2 is inserted. The thickness of slot 10 is only very slightly greater than the thickness of the blank so that the end of the blank is firmly held therein. Slot 10 is approximately the same length as blank 2, which length is less than the width of roll 7, and is deep enough so that the end of blank 2 may be inserted almost to the first fold of the corrugation, as shown in Fig. 7.

Rolls 7 and 8 are then rotated at the same speed towards the bight between the rolls. When slot 10 in roll 7 passes the bight, the end of blank 2 is bent to form a lip 11. Rotation of the rolls is continued until about two thirds of the length of blank 2 is curved around roll 7. Roll 7 is then raised away from roll 8 and blank 2 is removed from the mill.

Partially curved blank 2 is then turned around and the other end of the blank is inserted into slot 10. The rolls are then rotated in the same direction as in the initial curving operation, again until about two thirds of the length of blank 2 is curved about roll 7. A lip 12, similar to lip 11, is formed on the opposite end of blank 2 at the beginning of this bending operation. Roll 7 is then raised and blank 2, now curved over its entire length, is removed from the mill. It is preferred to overlap the initial and final bending operations because it insures that the blank has and will retain the proper curvature. If the final bending operation were confined to the uncurved residual portion from the initial bending operation the final curvature might not be complete and accurate.

Blank 2 is cut to a length sufficient to form a tube of predetermined diameter, say, for example, three feet. Roll 7 has a smaller diameter than the diameter of the completed tube. In the case of a three foot diameter for the completed tube, roll 7 would have a diameter of about two feet. The smaller diameter of roll 7 imparts to the blank a much sharper curvature than it holds in the completed tube. This sharper curvature is desirable because the springiness of the steel gives the blank a tendency to spring outwardly.

The completely curved blank is now placed on a mandrel 13 having the same diameter as the completed tube. Mandrel 13 has an insert 14 of resin impregnated material or of any suitable material that is a non-conductor of heat. Insert 14 has a slot 15 into which lips 11 and 12 are inserted. Lips 11 and 12 are bent to such an angle in the forming operation that they are parallel to each other at their juncture, the seam, when the tube is completely formed. Clamps 16, of any suitable construction, hold the curved blank snugly against mandrel 13 with lips 11 and 12 in slot 15.

A strip 17 of wire solder, or solder in other form, is then placed over the seam and heat is applied by any suitable means, as by a high frequency electronic coil 18, which is passed slowly over the tube at a distance above the tube, which will give a heat of about 400° Fahrenheit, sufficient to melt the solder. This heat is adequate for soldering, but is not high enough to form carbide precipitation on the steel. It is of great importance that the lips 11 and 12 be held firmly and snugly together during the soldering operation so that the solder will flow evenly and uniformly down through the joint and firmly solder all portions of the lips. The tube is then removed from mandrel 13 and after cooling is placed in a sodium carbonate or other alkaline bath to neutralize the effect of the acid soldering flux on the stainless steel. Although soldering is preferred, the lips may be secured together in any suitable manner, as by riveting, welding, etc.

Figure 11:
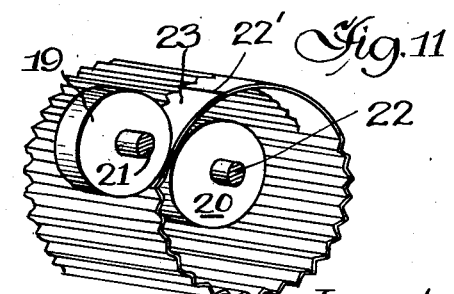
Fig. 11 is a fragmentary perspective view of the tube with its end being flattened.

The end of the tube is then slid between two rollers 19 and 20, mounted on shafts 21 and 22. Any suitable stop member (not shown) is used to limit the movement to the length of notches 3. This prevents lips 11 and 12 from engaging rollers 19 and 20. As rollers 19 and 20 are rotated valleys 5 are pressed out of the end of the tube, thus restoring the end of the tube to its original smooth condition. The other end of the tube is similarly flattened. The smooth ends of the tube are thus made flush with ridges 6. In this flattening operation the spreading of the metal is such, because of notches 3, that the final seam is butted, as shown at 22', in Fig. 11. This butted seam may be soldered if desired, but this is not essential. The smoothed end 23 is wide enough to permit an end cap to be secured to the end of the tube and thus close the same.

Although we have described the preferred method embodying our invention in considerable detail, it will be understood that the description is intended to be illustrative, rather than restrictive, as many details may be modified or changed without departing from the spirit or scope of our invention. The apparatus to be used for carrying out the process of our invention may, of course, be modified or varied, as desired.

We claim:

1. In a method of making a tube, the steps of rolling more than one half the length of a corrugated blank around one roll of a rolling mill, removing the partially curved blank from the mill, reversing the partially curved blank and rolling more than half of its length around said roll to impart the same curvature to the entire blank, holding said curved blank with the meeting ends in juxtaposition, placing solder along the seam between the meeting ends of said blank, and melting said solder to join said ends.

2. In a method of making a corrugated tube, the steps of rolling more than one half the length of a corrugated blank around one roll of a rolling mill to form a lip on one end of said blank and to impart a predetermined curvature to the rolled portion of said blank, removing the partially curved blank from the mill, reversing the partially curved blank and rolling more than half of its length around said roll to form a lip on the other end of said blank and to impart the same curvature to the entire blank, holding said curved blank with said lips in close parallel relationship, and securing said lips together permanently.

3. In a method of making a corrugated tube, the steps of rolling more than one half the length of a corrugated blank around one roll of a rolling mill, removing the partially curved blank from the mill, reversing the partially curved blank and rolling more than half of its length around said roll to impart the same curvature to the entire blank, clamping said blank around a mandrel with the meeting ends of said blank in juxtaposition, placing solder along the seam between the meeting ends of said blank, melting said solder to join said ends, and then flattening said corrugations adjacent the edges of said tube to form smooth areas for the reception of smooth skirted end caps.

4. In a method of making a corrugated tube, the steps of rolling more than one half the length of a corrugated blank around one roll of a rolling mill to form a lip on one end of said blank and to impart a predetermined curvature to the rolled portion of said blank, removing the partially curved blank from the mill, reversing the partially curved blank and rolling more than half of its length around said roll to form a lip on the other end of said blank and to impart the same curvature to the entire blank, clamping said blank around a mandrel with said lips held in close parallel relationship, securing said lips together permanently, and then flattening said corrugations adjacent the edges of said tube to form smooth areas for the reception of smooth skirted end caps.

5. In a method of making a perforated corrugated tube, the steps of notching the corners of a rectangular blank, cutting a plurality of apertures in said blank, corrugating said blank in such a manner as to position the apertures in the valleys of the corrugations, forming a lip on one end of said blank, curving a portion of said blank starting from said lip, forming a lip on the opposite end of said blank, curving a portion of said blank starting from said second lip, said two curving operations overlapping in the area curved, placing said lips in juxtaposition, permanently joining said lips together, and then smoothing the corrugations at the edges of said tube to the depth of the notches.

6. In a method of making a perforated corrugated tube, the steps of notching the corners of a rectangular blank, cutting a plurality of apertures in said blank, corrugating said blank in such a manner as to position the apertures in the valleys of the corrugations, forming a lip on one end of said blank, curving a portion of said blank starting from said lip, forming a lip on the opposite end of said blank, curving a portion of said blank starting from said second lip, said two curving operations overlapping in the area curved, placing said lips in juxtaposition and joining them together.

MILES A. LAMB.
JOSEPH J. KLEIN.
WILLIAM C. STRANBERG.
JULIUS H. FRANKOWSKI.

References Cited in the file of this patent

UNITED STATES PATENTS

| Number | Name | Date |
|---|---|---|
| 274,421 | Vincent | Mar. 20, 1883 |
| 290,659 | Austin | Dec. 25, 1883 |
| 469,731 | Althouse | Mar. 1, 1892 |
| 510,796 | Kegler | Dec. 12, 1893 |
| 786,923 | Smith | Apr. 11, 1905 |
| 901,963 | Hardie | Oct. 27, 1908 |
| 1,481,709 | Hauf | Jan. 22, 1924 |
| 1,665,815 | Mauser | Apr. 10, 1928 |
| 1,670,639 | Shipley | May 22, 1928 |
| 1,810,394 | Dyhr | June 16, 1931 |
| 2,278,155 | Steenstrup | Mar. 31, 1942 |
| 2,332,826 | Fryer | Oct. 26, 1943 |
| 2,358,960 | Cleve | Sept. 26, 1944 |
| 2,380,107 | Hobrock | July 10, 1945 |